United States Patent
Arisawa et al.

(10) Patent No.: US 7,330,881 B2
(45) Date of Patent: ***Feb. 12, 2008

(54) MUSIC-DATA REPRODUCING SYSTEM USING A DOWNLOAD PROGRAM

(75) Inventors: Ryukou Arisawa, Yokohama (JP); Hiroyuki Sasaki, Yokohama (JP); Yuichi Fujii, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/318,043

(22) Filed: Dec. 23, 2005

(65) Prior Publication Data

US 2006/0101132 A1     May 11, 2006

Related U.S. Application Data

(62) Division of application No. 09/642,622, filed on Aug. 18, 2000, now Pat. No. 7,039,686.

(30) Foreign Application Priority Data

Aug. 20, 1999   (JP)   ................. 11-234254

(51) Int. Cl.
    *G06F 15/16*   (2006.01)
    *G06F 15/177*  (2006.01)
    *G06F 9/445*   (2006.01)

(52) U.S. Cl. .............. 709/219; 709/221; 717/178

(58) Field of Classification Search ......... 709/203, 709/217, 219, 247; 455/414.3, 414.4, 517; 717/178
    See application file for complete search history.

(56) References Cited

U.S. PATENT DOCUMENTS

| 5,594,779 A | 1/1997 | Goodman .............. 455/3.04 |
| 5,734,119 A | 3/1998 | France et al. ............ 84/622 |
| 5,900,564 A | 5/1999 | Kurakake |

(Continued)

FOREIGN PATENT DOCUMENTS

EP   0 962 929   12/1999

(Continued)

*Primary Examiner*—William Vaughn
*Assistant Examiner*—Yemane M Gerezgiher
(74) *Attorney, Agent, or Firm*—Pearne & Gordon LLP

(57) ABSTRACT

A data card 101 with music data accumulated therein is inserted into a portable telephone 110 to fetch the music data into the portable telephone, and application software suitable for a music data format prescribed in association with the music data is selected from among a plurality of pieces of application software (131, 133) stored in a server 130 located remotely, and is downloaded. Through this configuration, the application software associated with the music data can be downloaded from the server to the portable telephone by the user's selection.

16 Claims, 4 Drawing Sheets

U.S. PATENT DOCUMENTS

| | | |
|---|---|---|
| 6,018,654 A | 1/2000 | Valentine et al. ......... 455/414.4 |
| 6,073,075 A | 6/2000 | Kondou et al. .............. 701/203 |
| 6,122,230 A * | 9/2000 | Scibora ................... 369/59.21 |
| 6,138,009 A | 10/2000 | Bigerson ..................... 455/419 |
| 6,333,928 B1 | 12/2001 | Schaal et al. ................ 370/360 |
| 6,351,442 B1 | 2/2002 | Tagawa et al. ........... 369/53.41 |
| 6,356,543 B2 | 3/2002 | Hall et al. ................... 370/352 |
| 6,366,791 B1 | 4/2002 | Lin et al. .................... 455/567 |
| 6,493,743 B2 * | 12/2002 | Suzuki ....................... 709/203 |
| 6,513,719 B1 | 2/2003 | Imura ......................... 235/492 |
| 6,529,584 B1 * | 3/2003 | Ravago et al. .............. 379/67.1 |
| 6,577,614 B1 | 6/2003 | Cook et al. ................. 370/338 |
| 6,587,684 B1 | 7/2003 | Hsu et al. ................... 455/419 |
| 6,871,048 B2 * | 3/2005 | Takagaki ................... 455/66.1 |
| 6,941,270 B1 * | 9/2005 | Hannula ........................ 705/1 |
| 2002/0065066 A1 | 5/2002 | Takagaki ..................... 455/412 |

FOREIGN PATENT DOCUMENTS

| | | |
|---|---|---|
| EP | 0 991 213 | 5/2000 |
| JP | 8-163640 | 6/1996 |
| JP | 9-331288 | 12/1997 |
| JP | 11-88556 | 3/1999 |
| JP | 11-164058 | 6/1999 |
| JP | 2001-16366 | 1/2001 |

* cited by examiner

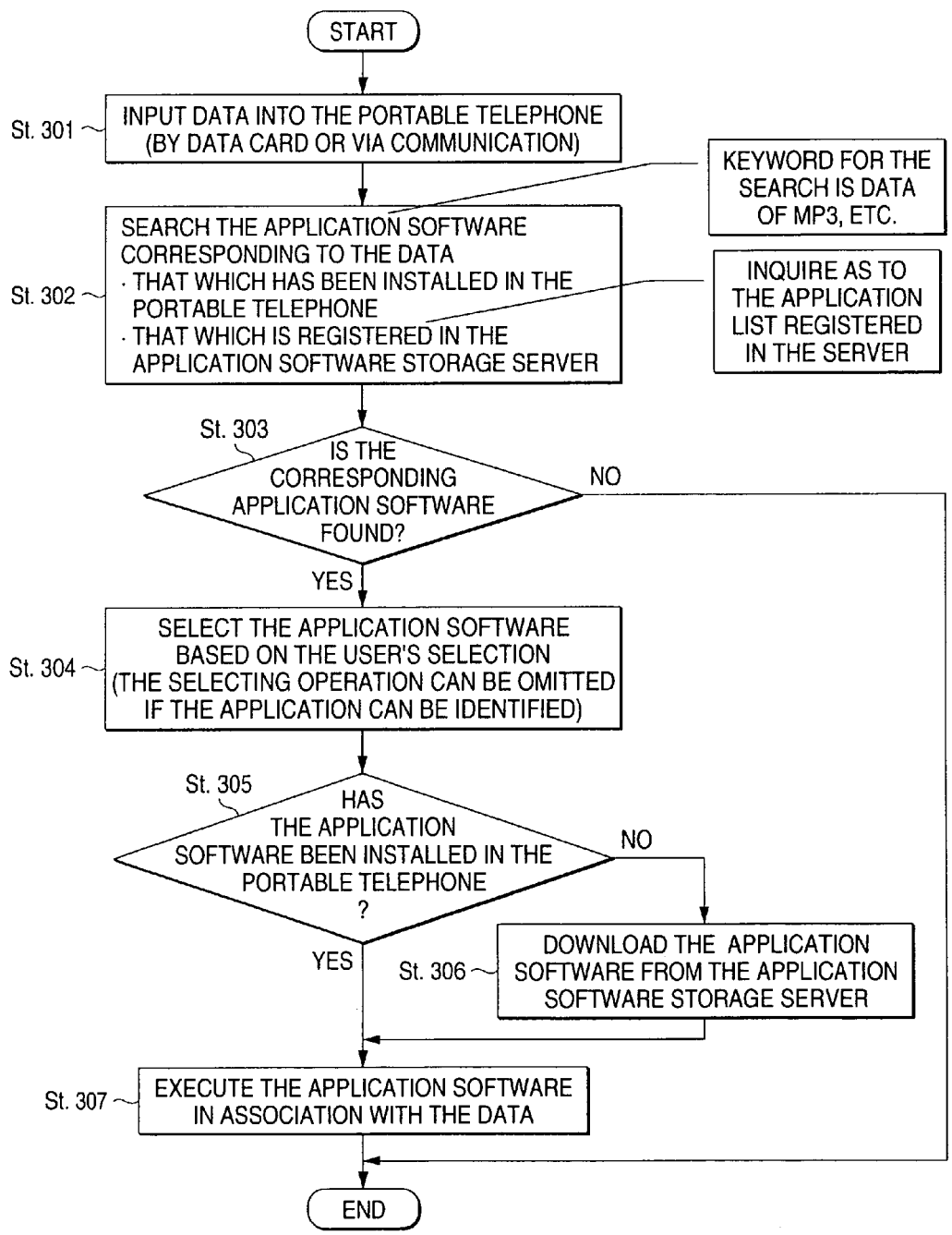

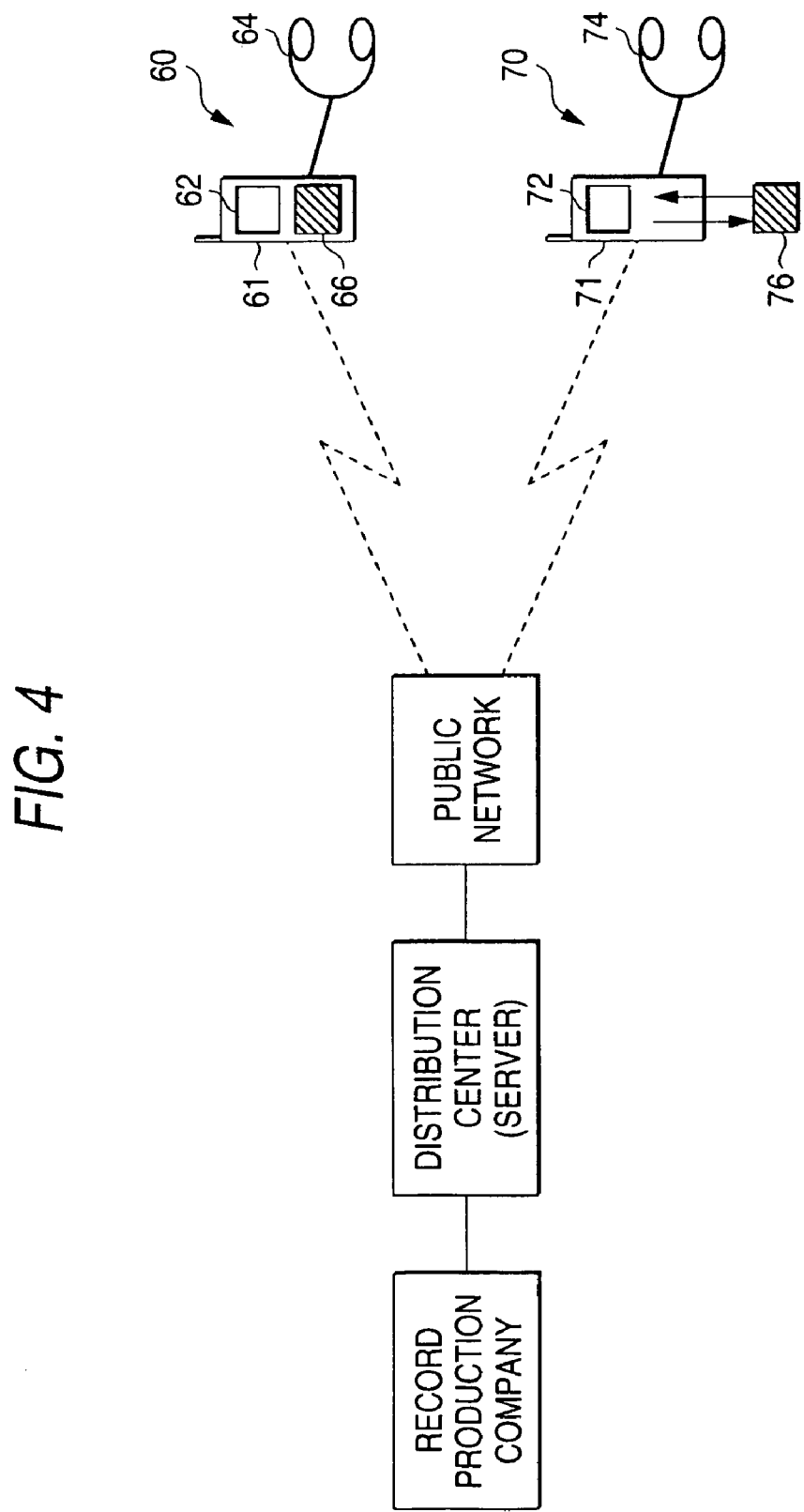

MUSIC-DATA REPRODUCING SYSTEM USING A DOWNLOAD PROGRAM

DIV of Ser. 09/642,622 filed on Aug. 18, 2000 now U.S. Pat. No. 7,039,686, which benefit from a foreign application JP 11-234254 filed Aug. 20, 1999

BACKGROUND OF THE INVENTION

The present invention relates to a system for reproducing music data by a download program, and more particularly to a system which is capable of downloading application software associated with music data from a server to a portable telephone, and which makes it possible to execute the application software (program) downloaded in association with the music data by the portable telephone.

Conventionally, as described in Japanese Patent Publication No. Hei.11-164058, a music selecting/listening system is known in which music data located remotely is selected and listened to by using a portable telephone or the like. A configuration of this music selecting/listening system is shown in FIG. 4.

In FIG. 4, in a portable telephone 60 incorporating a storage unit 66 in its main body 61, pushbuttons or the like on the main body 61 are operated to call a distribution center. Music data which has already been distributed to the distribution center from a record manufacturing company is outputted to a receiver 64 and a display 62, and is stored in the storage unit 66. The user is then able to enjoy music by reproducing the music data in the storage unit 66 even after the connection to a public communication line has been cut off.

In addition, in a portable telephone 70 having a storage medium 76 which is detachable from a main body 71, as the user downloads music data to the storage medium 76 of the portable telephone 70 by operating pushbuttons or the like on the main body 71, the user is able to enjoy this music data by a display 72 or a receiver 74. In addition, upon drawing out this storage medium 76 and inserting it into another audio unit, the user is able to enjoy reproduced music of higher quality. Further, the music data can be stored in the storage medium 76 by another audio unit, and upon inserting this storage medium 76 into this portable telephone 70, the user is able to enjoy the music.

However, with the above-described conventional music selecting/listening system in which music is selected and listened to by using a portable telephone or the like, the contents of music data which can be selected and listened to are of such specifications that they have been distributed from a record manufacturing company or through another audio unit. Hence, there has been a problem in that although it may be possible to display words on the display of the portable telephone, the user is unable to reproduce the music data according to one's own preferred specifications.

SUMMARY OF THE INVENTION

The invention is designed to overcome the above-described conventional problem, and its object is to provide a music-data reproducing system using a download program and making it possible to download application software associated with music data from a server to a portable telephone by selection by the user.

According to the first aspect of the invention, music-data reproducing system using a download program comprises:

a server having a plurality of pieces of application software; and a portable telephone which includes:

a storage means which stores music data;

a instructing means which instructs the server to download the application software corresponding to a music data format defined in connection with the music data, the application software is downloaded through a communication network; and an application software executing means which executes the application software by using the music data after completion of the downloading the application software.

Through the above-described configuration, the application software associated with the music data can be downloaded from the server to the portable telephone by the user's selection.

Further, the music-data reproducing system according to the present invention further includes a history recording means which records a history of the downloading after the downloading of the application software from the server.

Through the above-described configuration, the application software associated with the music data can be downloaded from the server to the portable telephone by the user's selection.

Moreover, according to the music-data reproducing system of the present invention, a list of downloadable application software in the server is transmitted to the portable telephone upon instruction from the portable telephone.

Through the above-described configuration, the application software associated with the music data can be downloaded from the server to the portable telephone by the user's selection, and the downloaded application software can be executed by the portable telephone.

Further, according to the music-data reproducing system of the present invention, the music-data reproducing system further comprising a storage medium capable to be mounted in the portable telephone, the storage medium stores the music data in advance, wherein the portable phone retrieves the music data from the storage medium and executes the application software associated with the music data.

Through the above-described configuration, the application software associated with the music data can be downloaded from the server to the portable telephone by the user's selection, and the downloaded application software can be executed by the portable telephone.

Moreover, according to the music-data reproducing system of the present invention, the music data is stored in the storage means of the portable phone by transmitted through a communication line.

Through the above-described configuration, the application software associated with the music data can be downloaded from the server to the portable telephone by the user's selection.

BRIEF DESCRIPTION OF THE DRAWINGS

FIG. 3 is a flowchart for explaining the operation of the music-data reproducing system using a download program in accordance with the embodiment of the invention.

FIG. 4 is a diagram illustrating the configuration of a conventional portable music selecting/listening system.

DETAILED DESCRIPTION OF THE PREFERRED EMBODIMENET

Figure 1:
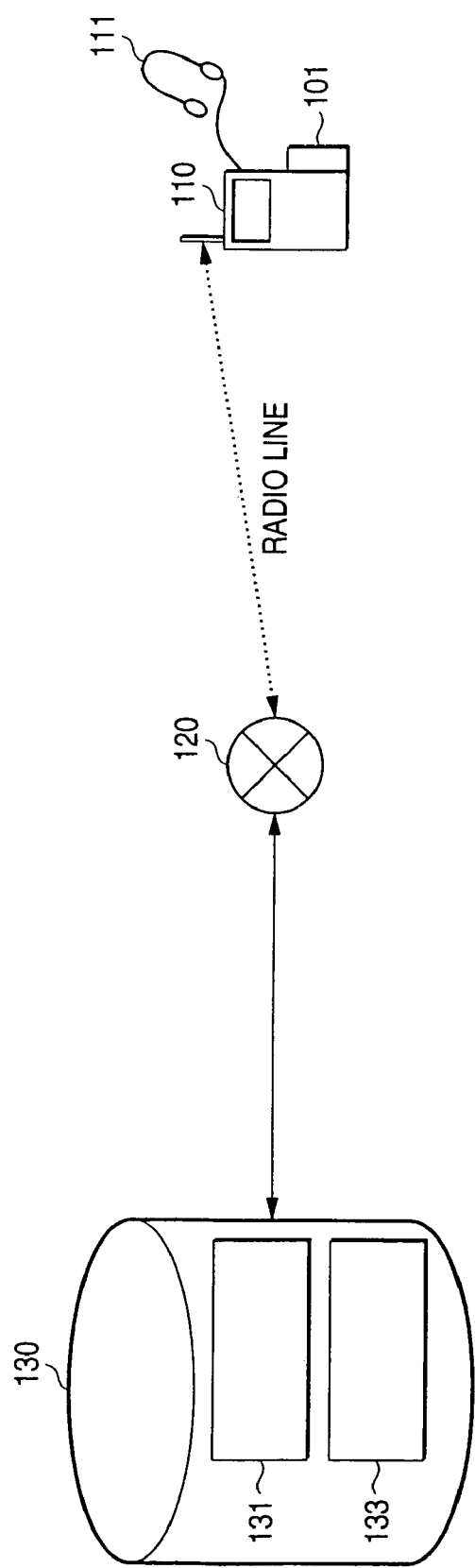
FIG. 1 is a diagram illustrating the configuration of a music-data reproducing system using a download program in accordance with an embodiment of the invention.
Figure 2:
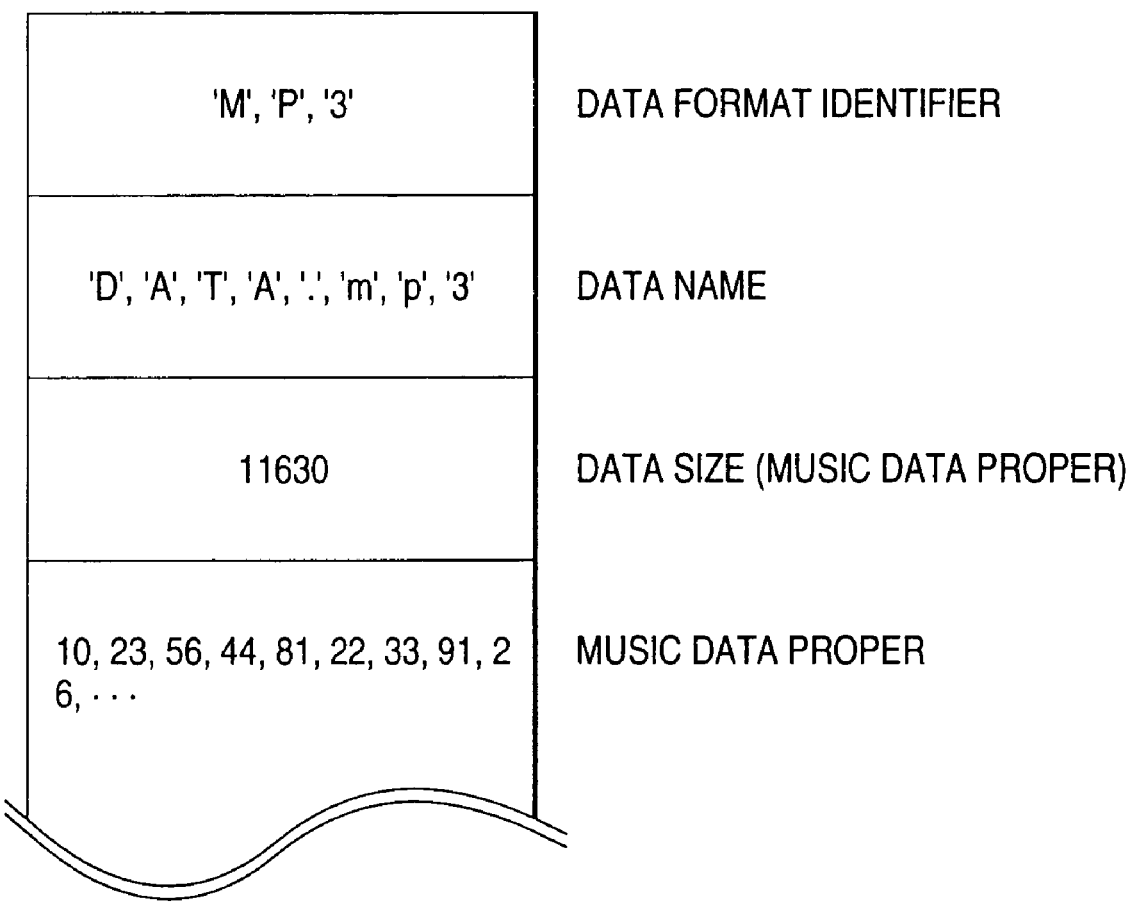
FIG. 2 is a diagram illustrating the structure of music data in accordance with the embodiment of the invention.

Referring now to FIGS. 1 to 3, a description will be given of an embodiment of the invention.

FIG. 1 is a diagram illustrating a schematic configuration of a music-data reproducing system using a download program in accordance with the invention. In FIG. 1, the music-data reproducing system using a download program in accordance with the invention is comprised of a portable telephone 110 capable of fetching music data from a data card 101 into which music data has been fetched in advance; a communication network 120 to which the portable telephone 110 is line-connected through a wireless line; and an information provider (application software storage server) 130 which is a server connected to the communication network 120 through a wire line to provide application software, and in which a plurality of pieces of application software (131, 133) are stored.

Music data which is written in the data card 101 is music data which is written in a music data format such as MP3, MPEG, Quick-Time, etc. For instance, music data of the aforementioned music data format is directly purchased (copied) to the data card 101 or the portable telephone 110 from a personal computer through Internet or from an exclusive-use terminal installed in a convenience store or the like, though not shown.

Music data is thus fetched to the portable telephone. Software for reproducing this music data of the music data format is not installed in advance in the main body of the portable telephone, and necessary software is used by being downloaded from the provider (server) to the portable telephone.

In addition, in a case where application software for reproduction has already been downloaded from the server and has been installed in the portable telephone, and by executing the software as it is, it is possible to reproduce music data according to the user's preferred specifications by a headphone 111 attached to the portable telephone 110 or by the display means.

It should be noted that if the application software for reproduction has not been downloaded from the server, the user inquires the information provider (application software storage server) 130 through the communication network 120 as to what application software is available, and a list of pieces of application software is displayed on the display screen of the portable telephone. If the application software desired by the user is available, an instruction is given to download that application software. After the downloading, this application software is executed, thereby making it possible to reproduce the music data by the headphone 111 attached to the portable telephone 110 or by the display means according to the user's preferred specifications.

FIG. 2 is a diagram illustrating the structure of music data, and music data concerning MP3 is shown in FIG. 2. If a further explanation is given to FIG. 2, "MP3" is written as a data format identifier, "data, mp3" is written as data name, "11630" bytes is written as the data size of the music data proper, and data such as "10, 23, 56, 44, 81, 22, 33, 91, 26, . . . " in decimal numbers (although essentially in binary numbers) is written as the contents of the music data proper.

FIG. 3 shows a flowchart for explaining the operation of the music-data reproducing system using a download program in accordance with the invention, which is shown in FIG. 1. Hereafter, a description will be given with reference to this flowchart.

First, in Step (abbreviated as St. in the flowchart) 301, music data is fetched to the portable telephone. As for the method of fetching music data, music data is fetched by using the data card shown in FIG. 1 or an I/O interface (not shown) attached to the main body through a communication line. It should be noted that, as for the method of fetching data to the data card, various methods are conceivable in addition to the aforementioned personal computer and exclusive-use terminal installed in a convenience store or the like, and the technical concept of the invention is not restricted solely to the illustrated method of fetching data.

Next, in Step 302, search is made for the presence or absence of application software corresponding to the aforementioned music data. Namely, search is first made as to whether there is a history of having already fetched that application software to the main body of the portable telephone. For example, in a case where reproduction application software of the data format of MP3 or the like has already been fetched, the fact that that application software has been installed in the portable telephone can be known by the search.

However, in a case where there is no history of having fetched such reproduction application software, since the application software of the music data format has not been installed in the portable telephone, the user searches through the communication network whether that application software has been registered in the information provider (application software storage server). At this time, by making an inquiry from the portable telephone to the information provider (application software storage server) for a list of application software registered in the server, the search can be made by the portable telephone side. Hence, from that list the user is able to confirm the presence or absence of the desired application software in the application software storage server. At this stage, the selection of the application software is not made.

Then, if it is determined in Step 303 that the corresponding application software in the portable telephone or in the application software storage server cannot be found as a result of the search, even if the music data is fetched, that data cannot be reproduced; therefore, the processing ends. Meanwhile, if it has been possible to find the corresponding application software in Step 303, the operation proceeds to an ensuing Step 304.

In Step 304, desired application software is selected by the user's operation. FIG. 1 illustrates an example in which music reproducing application software 131 and karaoke application software have been registered in the information provider (application software storage server) 130, but it is possible to select either one or both of them. Meanwhile, in a case where application software can be specified unitarily, the user's selecting operation may be omitted.

Next, the operation proceeds to Step 305 in which a determination is made as to whether or not the user's preferred application software has been installed in the portable telephone. If the user's preferred application software has not been installed in the portable telephone as a result of the determination, the operation proceeds to Step 306. In Step 306, the application software is downloaded from the application software storage server. Subsequently, the operation proceeds to Step 306.

On the other hand, if it is determined in Step 305 that the user's preferred application software has been installed in the portable telephone, the operation proceeds to Step 307. In Step 307, the application software is executed in association with the data. Upon completion of the execution, the processing ends.

As described above, in accordance with the music-data reproducing system using a download program, an advantage is obtained in that it is possible to download application software associated with music data from a server to a portable telephone, and the program downloaded in association with the music data can be executed by the portable telephone.

What is claimed:

1. A method of transmitting a music reproducing application, comprising:

identifying a music content data stored in a storage portion in a portable terminal;

searching whether there is a history of the music reproducing application stored in the storage portion in the portable terminal and if there is no said history, searching a communication network for the music reproducing application, wherein the reproducing application enables reproduction of the identified music content data;

instructing a server via an instructing portion of the portable terminal to transmit reproducing information about the reproducing application to the portable terminal through the communication network when the music reproducing application that enables the reproduction of the identified music content data is not stored in the storage portion; and receiving the reproducing information in response to an instruction from the portable terminal, wherein the reproducing information includes the music reproducing application that enables the reproduction of the identified music content data.

2. The method as set forth in claim 1, wherein the reproducing information includes a list of a plurality of reproducing applications that enables the reproduction of the identified music content data and is transferable from the server to the portable terminal through the communication network.

3. The method as set forth in claim 2, further comprising:

selecting the music reproducing application from the list;

requesting the server to transmit the selected reproducing application to the portable terminal through the communication network; and receiving the selected reproducing application.

4. The method as set forth in claim 1, wherein the storage portion is detachable from the portable terminal.

5. The method as set forth in claim 1, further comprising a process of receiving the music content data through the communication network.

6. The method as set forth in claim 1, wherein in the identifying process, a format of the music content data is identified; and wherein in the searching process, the music reproducing application that enables the reproduction of the music content data having the identified format is searched.

7. The method as set forth in claim 6, wherein the format of the content data is at least one of MP3, MPEG and Quick Time.

8. The method as set forth in claim 1, further comprising a process of recording a history of the transmission in which the reproducing application was downloaded and stored in the storage portion.

9. A system of transmitting a music reproducing application, comprising:

a server configured to store a plurality of reproducing applications; and a portable terminal, wherein the portable terminal includes:

a storage portion configured to store the music reproducing application and music content data;

an identifying portion that identifies the music content data stored in the storage portion;

a searching portion that searches to determine whether there is a history of the music reproducing application being stored in the storage portion and that searches the storage portion when there is no said history for the music reproducing application that enables reproduction of identified music content data;

an instructing portion that transmits an instruction to the server through the communication network when the music reproducing application that is enabled to reproduce the identified music content data is not found in the storage portion; and wherein the server transmits reproducing information about the music reproducing application to the portable terminal in response to the instruction received from the portable terminal and wherein the reproducing information includes the music reproducing application that enables the reproduction of the identified music content data.

10. The system as set forth in claim 9, wherein the reproducing information includes a list of the reproducing application that enables the reproduction of the identified music content data and is transferable to the portable terminal through the communication network.

11. The system as set forth in claim 10, wherein the portable terminal includes a selecting portion that selects the music reproducing application from the list;

wherein the portable terminal includes a requesting portion that requests the server to transmit the selected reproducing application to the portable terminal through the communication network; and wherein the server transmits the selected reproducing application to the portable terminal.

12. The system as set forth in claim 9, wherein the storage portion is detachable from the portable terminal.

13. The system as set forth in claim 9, wherein the portable terminal receives a receiving portion that receives the content data through the network.

14. The system as set forth in claim 9, wherein the identifying portion identifies a format of the content data; and wherein the searching portion searches the reproducing application that enables the reproduction of the Content data having the identified format.

15. The system as set forth in claim 9, wherein the format of the content data is at least one of MP3, MPEG and Quick-Time.

16. The system as set forth in claim 14, wherein the portable terminal includes a recording portion that records a history of the transmission in which the reproducing application was downloaded and stored in the storage portion.

* * * * *